Sept. 7, 1937.　　　G. W. BAUGHMAN　　　2,092,366
ACCELERATION AND DECELERATION CONTROL SYSTEM
Filed June 12, 1934　　2 Sheets-Sheet 2
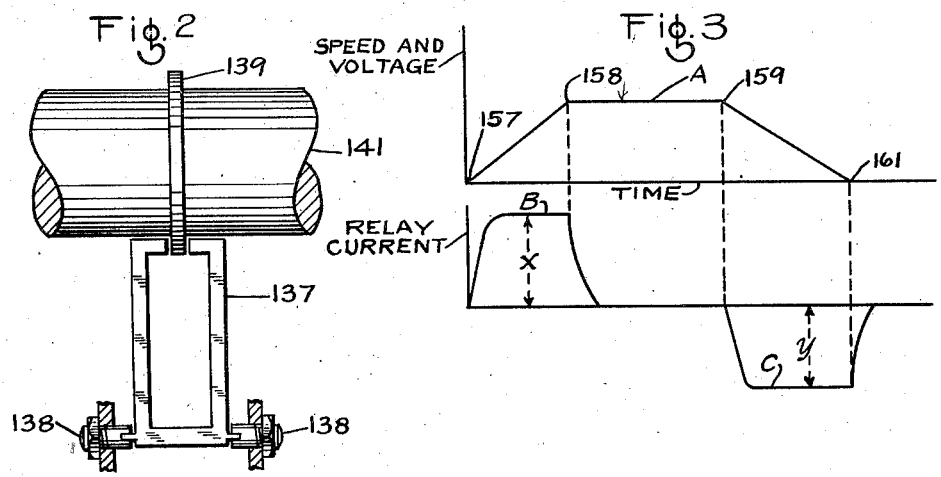
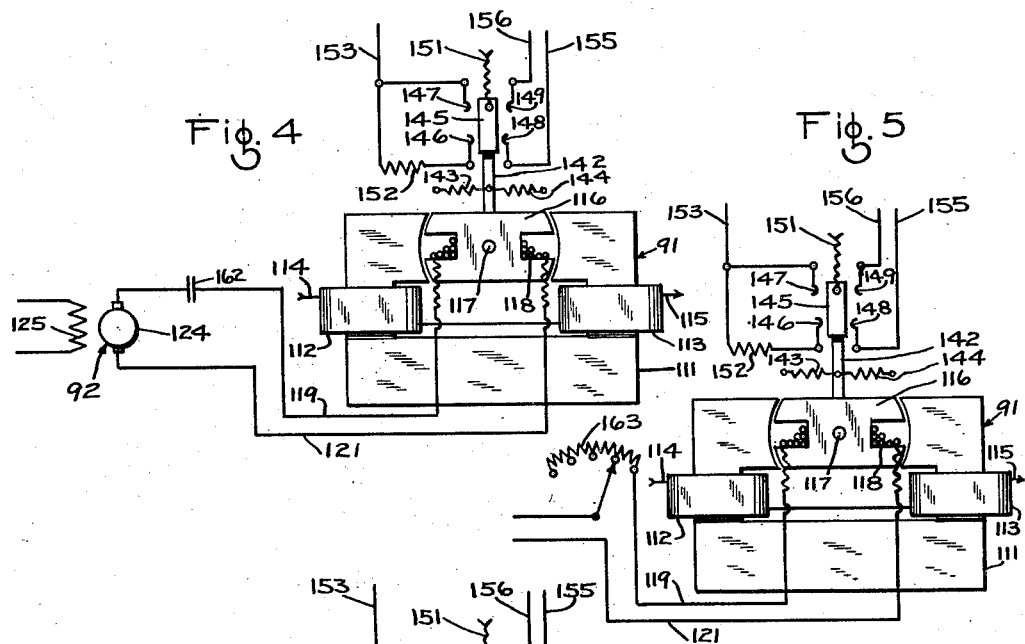
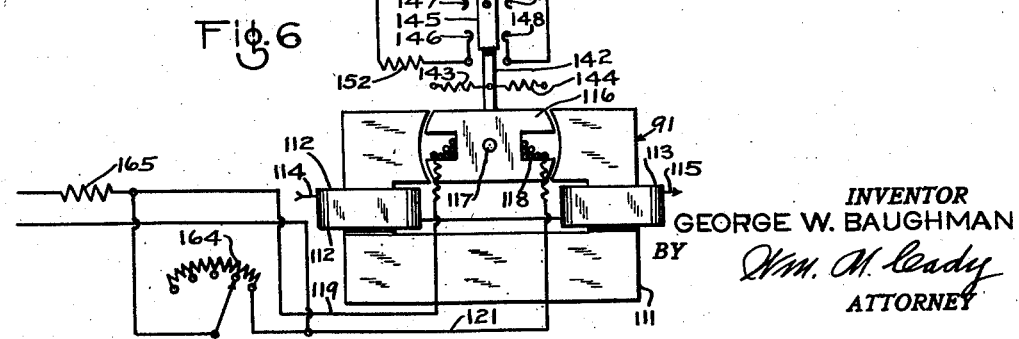
INVENTOR
GEORGE W. BAUGHMAN
BY
Wm. M. Cady
ATTORNEY Patented Sept. 7, 1937

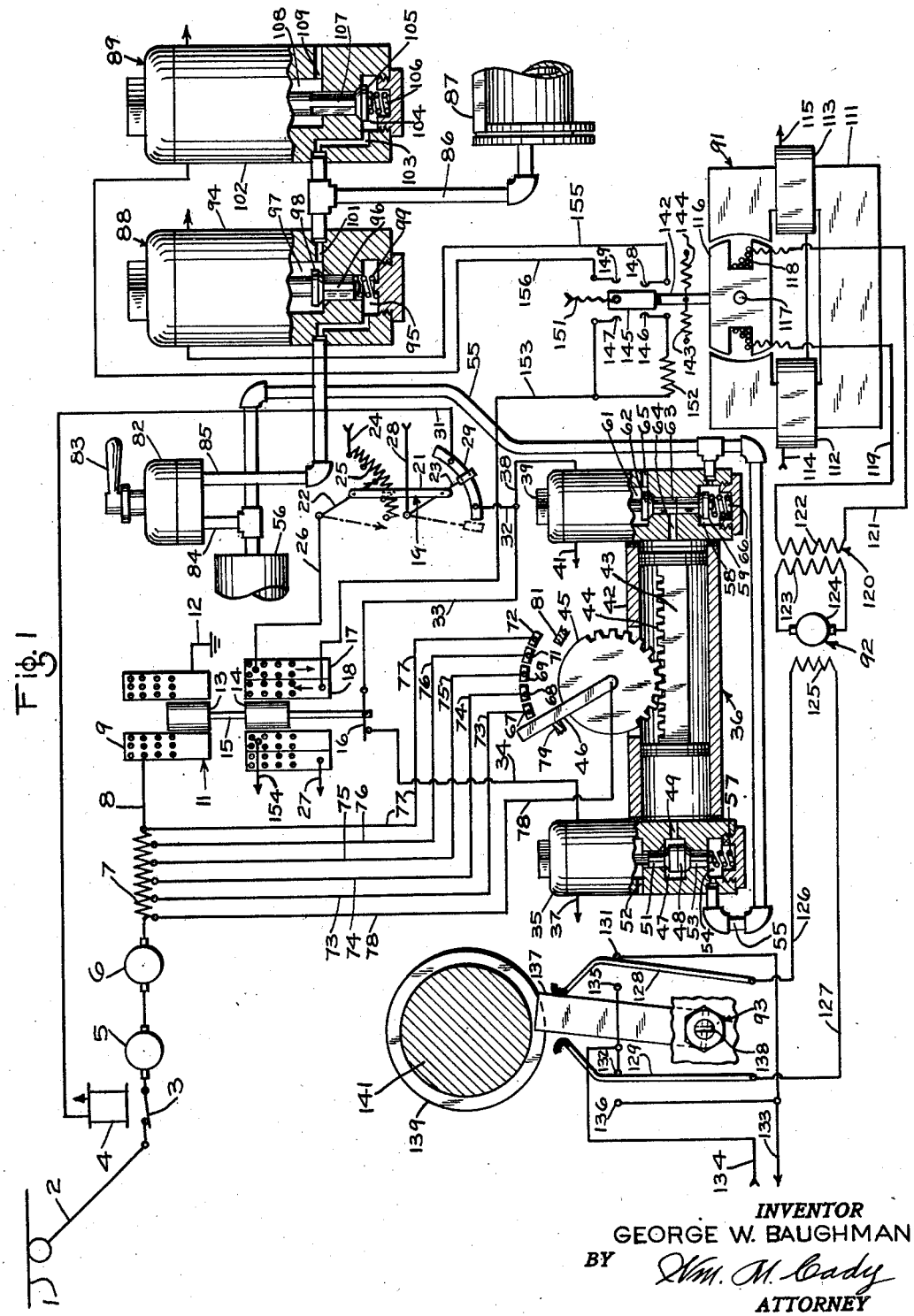

2,092,366

UNITED STATES PATENT OFFICE 2,092,366

ACCELERATION AND DECELERATION CONTROL SYSTEM

George W. Baughman, Edgewood, Pa., assignor to The Westinghouse Air Brake Company, Wilmerding, Pa., a corporation of Pennsylvania Application June 12, 1934, Serial No. 730,231

14 Claims. (Cl. 303—24)

My invention relates to an acceleration and deceleration control system for railway vehicles and is particularly adapted for use on vehicles driven by electric motors and retarded by electro-pneumatic brake equipment.

In vehicles employing friction type brakes, it is well known that for a given braking pressure such brakes are less effective in retarding the motion of a vehicle at high speeds than at low speeds, because the coefficient of friction between the rubbing parts is lower at high speeds than at low speeds. In order to bring a vehicle to a stop quickly it has been the usual practice for an operator to apply the brakes with a high degree of braking pressure at high speeds, and, as the speed of the vehicle decreases, to cause the braking pressure to decrease at such a rate that the vehicle is brought to a stop quickly and smoothly without dangerous shock, or skidding of the wheels. It has heretofore been proposed to provide retardation control apparatus to accomplish this varying of the braking pressure automatically in accordance with a preselected rate of retardation. When a retardation rate controller is employed, the selected rate may be so great as to cause skidding of the wheels unless provision is made to limit the rate of retardation in such cases.

In the case of vehicles driven by electric motors it is usual to provide a notching controller that is governed by a master controller, and, when put into operation, automatically cuts out resistance from the motor circuit step by step until the motor is brought up to full speed. In order to provide against too great overloading of the motor it is desirable to provide means for limiting the rate of operation of the notching controller during acceleration of the vehicle. It is desirable, therefore, in many installations, to provide a retardation and acceleration controller for limiting the rate of change in speed of the vehicle both during starting and stopping.

It is an object of my invention to provide an acceleration and deceleration control system for limiting the rate of increase, and the rate of decrease, in the speed of the vehicle.

It is a more specific object of my invention to provide an acceleration and retardation control system in which the limiting rate of change in the vehicle's speed is controlled by an electrical device responsive to the vehicle speed.

It is another object of my invention to provide an acceleration and retardation controller comprising an electrical relay energized with one polarity during acceleration of the vehicle and with the opposite polarity during deceleration of the vehicle, the relay completing circuits for controlling the acceleration or deceleration of the vehicle.

Other objects and advantages of my invention will appear from the following description of a specific embodiment thereof when taken in conjunction with the accompanying drawings in which Fig. 1 is a diagrammatic view of circuits and apparatus comprising one preferred embodiment of the invention, Fig. 2 illustrates a detail of the vehicle directional switch, and Fig. 3 illustrates curves showing the operation of the acceleration and deceleration control relay and, Figs. 4, 5, and 6 illustrate different circuit arrangements for controlling the energization of the acceleration and deceleration control relay.

Referring to Fig. 1 of the drawings, a motor circuit extends from an overhead conductor 1 through a trolley 2, contact member 3 of a circuit breaker 4, the driving motors 5 and 6, control resistor 7, conductor 8, winding 9 of a current limiting relay 11 to ground at 12. The winding 9 actuates a core 13 of the current limiting relay 11 that is mechanically connected to a core 14 by a stem 15, and which also extends downwardly and is connected to a contact member 16. Windings 17 and 18 are associated with the core 14 of the relay, the winding 17 acting to bias the core 14 downwardly against the upward movement pull of the core 13, and the winding 18 being so wound and connected as to have a differential relation to the winding 17.

A master controller 19 is provided for controlling the operation of the driving motors 5 and 6, and comprises an acceleration handle 21 for operating the contact members 22 and 23. When operated toward the right from the position shown in the dot and dash line the contact member 22 closes a circuit from a source of electric energy, through conductor 24, resistor 25, contact member 22, conductor 26, winding 17 and conductor 27 to the source of energy. At the same time a circuit is completed from a source of energy through conductor 28, movable contact member 23 actuated by the acceleration handle 21, segment 29, conductor 31 to the winding of the circuit breaker 4, energizing the circuit breaker and operating its contact member 3 into a circuit closing position to complete a circuit to the motors 5 and 6. Control circuits are also completed from the conducting segment 29 through conductor 32, one circuit extending along conductor 33, contact member 16 of the current limiting relay 11, conductor 34, the winding of a holding magnet valve device 35 of the acceleration controller 36, and conductor 37 to a source of energy. A second control circuit extends from the conducting segment 29, through conductors 32 and 38, the winding of the operating magnet valve device 39, and conductor 41 to the source of energy. The above described operation of the acceleration handle 21 causes the winding 17 of the current limiting relay 11 to be energized to an extent depending upon the amount of resistance 25 that is in circuit therewith. The degree of energization of the windings 17 and 18 determines the downward pull on the core 14 that is required to be overcome by the upward pull of the core 13, energized by the winding 9, in order to move the relay contact member 16 to a circuit interrupting position. The above traced circuits completed through the contact segment 29 cause the holding magnet valve 35 and the operating magnet valve device 39 to be actuated downwardly to their illustrated positions, thus causing operation of the acceleration controller 36.

The acceleration controller 36 also comprises a casing 42 extending between the magnet valve devices 35 and 39, and which defines a cylindrical chamber for containing the piston assembly 43 that is provided with a rack 44 upon the upper side thereof for engaging gear teeth on a pinion 45 which actuates the contact controlling member 46. The holding magnet valve device 35 comprises a casing enclosing a valve chamber 47 containing a double beat valve 48, from which valve chamber a port 49 leads into the left end of the piston chamber, a port 51 leads upwardly to an exhaust port 52 for connecting the left hand end of the piston cylinder with the atmosphere when the valve 47 is in its lower, or illustrated, position, and a port 53 leads downwardly and connects with an inlet chamber 54 that is connected by a pipe 55 to the reservoir 56. A spring 57 is provided in the inlet chamber 54 for biasing the valve 48 upwardly. The operating magnet valve device 39 comprises a casing enclosing an inlet valve chamber 58, containing the valve 59, and an outlet valve chamber 61 containing the valve 62. These two valve chambers are united by a port 63 from which branch port 64 leads into the left end of the piston chamber for supplying it with air under pressure from the inlet valve chamber 58, or for releasing air through the outlet valve chamber 61 and exhaust port 65. A spring 66 is provided in the inlet valve chamber for biasing the valves 59 and 62 upwardly against the force of the operating magnet. The contact arm 46 carried by the pinion 45 is adapted when moved in a clockwise direction from its illustrated position to consecutively engage the contact segments 67, 68, 69, 71 and 72 thus completing circuits through conductors 73, 74, 75, 76 and 77, and conductor 78 to shunt increasing portions of the starting resistor 7 from the motor circuit. When the motors 5 and 6 are not energized the contact arm 46 remains in engagement with a stop 79 as illustrated, and upon operation of the acceleration controller to increase the speed of the motors 5 and 6 a stop 81 prevents the contact arm 46 from passing beyond the contact segment 72.

A brake equipment is provided of the well known fluid pressure type and comprises a brake valve 82 operated by a handle 83 for connecting the reservoir 56 through pipes 84, 85, and the brake cylinder pipe 86 to the brake cylinder 87 to apply the brakes, and for releasing air under pressure from the brake cylinder 87 through the brake valve 82 to the atmosphere in a well known manner to release the brakes. An application magnet valve device 88 is located between the pipes 85 and 86 and is normally maintained in its open or illustrated position to permit free flow of air between the brake valve 82 and the brake cylinder 87. A release magnet valve device 89 is provided and is normally maintained in its closed position in order to maintain pressure within the brake cylinder 87. The application magnet valve device 88 and the release magnet valve device 89 are controlled by operation of an acceleration and deceleration control relay 91 one part of which is energized from an axle driven generator 92 that is operated in accordance with the speed of the vehicle and energized in a direction depending upon the direction of movement of the vehicle as determined by a vehicle directional switch 93. The relay 91 also controls the energization of a differential winding 18 on the current limiting relay 11 to control the rate of operation of the acceleration controller 36.

The application magnet valve device 88 comprises a casing 94 enclosing an inlet chamber 95 in the lower portion thereof from which a port 96 leads upwardly into an application valve chamber 97, and is adapted to be closed by the application valve 98 that is normally biased to its upper or open position by a spring 99 in the inlet chamber 95. An outlet port 101 communicates from the valve chamber 97 with the brake cylinder pipe 86. The release magnet valve device 89 comprises a casing 102 having an inlet port 103 connecting the brake cylinder pipe 86 with a valve chamber 104 containing a valve 105 normally biased to its upper or closed position by a spring 106 to close a port 107 communicating between the valve chamber 104 and outlet chamber 109 to exhaust port 108.

The acceleration and deceleration control relay 91 is provided with a field core structure 111 that is energized by windings 112 and 113, that are connected in series in a circuit represented by conductors 114 and 115 and energized from a suitable source of direct current energy. An armature core 116 is pivotally supported at 117 between the pole faces of the U-shaped field core 111, and is energized by an armature winding 118 that is connected by conductors 119 and 121 to the secondary winding 122 of a transformer 120. A primary winding 123 of the transformer 120 is energized from the armature winding 124 of an axle driven generator 92 that is operated in accordance with the speed of the vehicle. The generator field winding 125 is energized from conductors 126 and 127 that are respectively connected to the contact plates 128 and 129 of the vehicle directional switch 93. In the illustrated position of the switch 93 the contact plates 128 and 129 are respectively in engagement with contact members 131 and 132, that are connected by conductors 133 and 134, respectively, to a suitable source of direct current energy. In the second operative position of the vehicle directional switch 93 the switch plates 128 and 129 are in contact, respectively, with contact members 135 and 136 thus reversing the direction of energization of the field winding 125 of the axle driven generator 92.

The vehicle directional switch 93 is actuated to one of its two operative positions by a U-shaped magnet 137 that is pivotally supported at 138, the open end of the U-shaped core being positioned upon opposite sides of a metallic flange 139 of magnetizable material carried by a shaft 141, as best shown in Fig. 2. The magnetic drag existing between the flange 139 and the U-shaped armature 137 causes the armature to be actuated in the one or the other direction in accordance with the direction of rotation of the shaft 141, which may be an axle of the vehicle or any shaft driven in accordance with speed of the vehicle.

The armature core 116 of the relay 91 carries an arm 142, that is normally biased to its central or illustrated position by the springs 143 and 144, and at the outer end of which a contact member 145 is carried that is adapted to be actuated into engagement with acceleration control contact members 146 and 147 or into engagement with deceleration control contact members 148 and 149. Upon engagement of the contact member 145 with the contact member 146 a circuit is completed from a source of electric energy through conductor 151, contact members 145 and 146, resistor 152, conductor 153, the winding 18, and conductor 154 to the source of energy, thus energizing the winding 18 to partially neutralize the effect of the winding 17. Upon a further movement of the contact member 145 toward the left engagement is made between contact members 145 and 147 thus completing a circuit through the coil 18, in shunt relation to the resistor 152, to further energize the winding 18 and more nearly neutralize the effect of the winding 17, thus permitting the current limiting relay 11 to move its contact member 16 upwardly upon a smaller current flow through the winding 9.

If the contact member 145 is actuated toward the right until it engages contact member 148 a circuit is completed from the conductor 151 through contact members 145 and 148, conductor 155, and the winding of the application magnet valve device 88 to ground. The valve 98 is accordingly actuated downwardly to close the port 96 and interrupt the flow of air through the brake valve 82 to the brake cylinder 87, thus preventing further increase in pressure in the brake cylinder 82. If the contact member 145 moves further toward the right it will engage the contact member 149 and complete a circuit through the conductor 156 and the winding of the release magnet valve device 89, thus forcing the valve 104 downwardly to open the passage through the port 107 and release air under pressure from the brake cylinder 87 through exhaust port 109 to release the brakes.

Operation of the relay 91 will be best understood by reference to Fig. 3 in which the curve A represents a speed-time curve of the vehicle and the curves B and C represent the current through the winding 118 of the relay. The curve A may be regarded also as representing the current through the armature winding 124 of the acceleration generator 92 and the primary winding 123 of the transformer in Fig. 1. From the point 157 to the point 158 on the curve A the vehicle is accelerating at a uniform rate as represented by the straight line joining these two points. The direct current through the primary winding 123 of the transformer 120 will accordingly build up as shown by the curve A. The current induced in the secondary winding 122 of the transformer 120 will build up to a value X, as shown by the curve B, at which value the current is maintained constant so long as the rate of acceleration remains constant.

From the point 158 to 159 on the curve A the speed of the vehicle remains constant as does also the direct current through the primary winding 123 of the transformer 120. Since the current in the secondary winding 122 of the transformer is dependent upon the rate of change of the primary current, the current will drop to zero value as represented by the downward sweep of the curve B and remain at zero until the rate of speed of the vehicle again changes.

From the point 159 to the point 161 on the curve A the vehicle is represented as decelerating at a uniform rate as indicated by the straight line between these two points. A current will accordingly build up in the secondary winding 122 of the transformer 120 as shown by the curve C to a value Y, dependent upon the rate of deceleration of the vehicle, and remain at that value so long as the rate of deceleration remains constant. The curve C is similar in character to the curve B except that it is on the other side of the zero line and represents the flow of current through the secondary winding 122 of the transformer and the winding 118 of the relay 91 in the opposite direction.

During the acceleration period of the vehicle, current flows through the winding 118, as represented by curve B, causing a torque on the armature of the relay 91 that is proportional to the current value and which actuates it in a counter-clockwise direction to cause engagement of the contact 145 with the contact members 146 and 147 to close the circuit above traced. As soon as the vehicle reaches a constant speed the energization of the relay winding 118 ceases and the relay armature 116 and the contact member 145 are actuated by the springs 143 and 144 to their mid, or illustrated, positions. During the period of deceleration represented by the curve C, current will flow through the winding 118 of the relay 91 in a direction to cause movement of the core 116, and contact member 145, in a clockwise direction to close circuits through contact members 148 and 149 as above traced. The current values through the relay winding 118 represented by the ordinates X and Y of the curves B and C, respectively, will be dependent upon the rate of acceleration or deceleration of the vehicle.

Since the generator 92 is driven from the axle of the vehicle a reversal in the direction of operation of the vehicle will cause a reversal in the polarity or direction of current through the generator armature, unless the direction of energization of the field winding 125 is reversed upon reversal of direction of operation of the vehicle. In order to provide against such reversal of polarity of the generator 92, and to insure that the relay 91 will always operate in a counter-clockwise direction during acceleration of the vehicle, and in a clockwise direction during deceleration of the vehicle, the vehicle directional switch 93 is provided for automatically reversing the direction of energization of the generator field winding 125 upon a reversal in the direction of operation of the vehicle.

To summarize the operation of the acceleration and deceleration system as a whole, if the operator wishes to start the vehicle the acceleration handle 21 is moved toward the right to close a circuit through the contact member 23 and contact segment 29 for operating the circuit breaker 4 to its circuit closing position, thus completing a circuit through the motors 5 and 6, and, at the same time, completing a circuit through the winding of the operating magnet valve device 39 and the holding magnet valve device 35 of the acceleration controller 36. The valves of the devices 35 and 39 are accordingly operated downwardly, the device 35 venting that portion of the piston chamber to the left of the piston assembly 43 through ports 49, 51 and 52 to the atmosphere. The operating magnet valve device 39 cuts off communication between the piston chamber to the right of the piston assembly 43 and the atmosphere through exhaust port 65, and admits air under pressure from the pipe 55 through valve chamber 58 and port 64 to operate the piston assembly 43 toward the left. The pinion 45 and contact arm 46 are accordingly moved in a clockwise direction to cut successive portions of the resistor 47 from the motor circuit and accelerate the motors 5 and 6. The motor current circuit includes the winding 9 of the current limiting relay 11, which, upon the flow of a predetermined current therethrough, operates upwardly to interrupt a circuit through its contact member 16 and deenergizes the winding of the holding magnet valve device 35. The valve 48 is thus forced upwardly by the spring 57, closing the passage through the exhaust port from the left of the piston assembly 43, and supplying air to this portion of the piston chamber through pipe 55, valve chamber 47 and port 49, thus preventing further operation of the arm 46 in a clockwise direction until the holding magnet valve device 35 is again energized. The current through the motor circuit and the winding 9 of the current limiting relay required to operate the relay to deenergize the holding magnet 35 is determined by the energization of the relay winding 17 which is greater, the further the acceleration handle 21 is moved toward the right, thus cutting out of the circuit a greater portion of the resistor 25.

During acceleration of the vehicle the acceleration and deceleration control relay 91 is actuated in a counter-clockwise direction as above explained, and, should the rate of acceleration of the vehicle become sufficient, the contact member 145 would engage the contact member 146 thus partially energizing the winding 18 and correspondingly neutralizing the effect of the winding 17 to permit the current limiting relay 11 to open with a smaller amount of current through the winding 9. This causes operation of the current limiting relay 11 to permit a smaller maximum current through the motors 5 and 6. Should this maximum motor current cause a rate of acceleration that is still larger than that determined by the relay 91, the contact member 145 thereof will be moved further toward the left, causing engagement between it and the contact member 147 to further increase the energization of the differential winding 18 of the relay 11 to more completely neutralize the effect of the winding 17, and to establish a new setting for the current limiting relay whereby it will open when a smaller current flows through the coil 9.

Unless otherwise operated by the control relay 91, the application magnet valve device 88 remains in its open or illustrated position, and the release magnet valve device 89 remains in its illustrated or closed position. The operator may, accordingly, move the handle 83 of the brake valve 82 to supply fluid under pressure to the brake cylinder 87 through the open application valve device 88, or to vent air under pressure from the brake cylinder through the valve device in the usual way, the pressure being maintained in the brake cylinder by the release magnet valve device 89 in its closed position. If the rate of deceleration of the vehicle is greater than that permitted by the relay 91 the contact member 145 will be moved in a clockwise direction to close the application magnet valve device 88 and prevent further increase in pressure in the brake cylinder, and, upon a further operation in a clockwise direction, to close a circuit to the winding of the release magnet valve device 89 and cause it to operate to vent air under pressure from the brake cylinder 87 to the atmosphere, thus releasing the brake, until the rate of deceleration of the vehicle has been reduced to a value sufficient to cause separation of the contact members 145 and 149.

Fig. 4 illustrates a second preferred embodiment of means for maintaining the acceleration and deceleration relay 91 energized in accordance with the rate of acceleration and deceleration of the vehicle. The transformer 120 illustrated in Fig. 1 is omitted from the circuit shown in Fig. 4 and a condenser 162 is connected in series circuit relation between the armature winding 124 of the axle driven generator 92 and the winding 118 of the relay 91. In this embodiment of the invention, while the speed of the vehicle increases between points 157 and 158 on the curve A shown in Fig. 3, the speed and voltage of the generator 92 correspondingly increases causing a charging current to flow from the generator to the condenser 162 in accordance with the curve B of Fig. 3. A counter-electromotive force is built up on the condenser 162 that is equal and opposite to the electro-motive force from the armature winding 124 of the generator 92. While the vehicle is operating at constant speed, as represented by the portion of the curve A between points 158 and 159, the voltage of the generator 92 and of the condenser 162 remains constant and there is no exchange of current between them. Energy remains stored in the condenser 162 as a result of the current shown by the curve B from the generator to the condenser. During deceleration of the vehicle this stored energy causes a discharging current to flow from the condenser 162 to the generator 92, which will be in the opposite direction to the charging current as represented by the curve C in Fig. 3.

The acceleration and deceleration control relay 91 illustrated in Figs. 5 and 6 corresponds to the relay illustrated in Figs. 1 and 4 and may be energized by means of the mechanisms illustrated in either of these figures. In Fig. 5 an adjustable rheostat 163 is provided in series with the relay winding 118 for adjusting the degree of acceleration or deceleration that it is desired to permit. In Fig. 6 an adjustable rheostat 164 is illustrated in shunt relation to the relay winding 118 and a resistor 165 is also illustrated in series relation to the winding 118 which may be employed if desired. By the use of such resistors the relay 91 may be adjusted to permit any desired degree of acceleration or deceleration.

While I have illustrated and described certain preferred embodiments of my invention, it will be apparent that many modifications thereof will occur to those skilled in the art within the spirit of my invention, and I do not wish to be limited otherwise than by the scope of the appended claims.

Having now described my invention, what I claim as new and desire to secure by Letters Patent is:

1. In a brake equipment for vehicles, the combination with a fluid pressure braking means, of means for limiting the deceleration of said vehicle comprising an application magnet valve, a release magnet valve, electro-responsive control means therefor, and means for energizing said electro-responsive control means in accordance with the rate of deceleration of said vehicle.

2. In a brake equipment for vehicles, the combination with a fluid pressure braking means, of means for limiting the deceleration of said vehicle comprising an electro-responsive control means, a direct current generator operated in accordance with the speed of the vehicle, and means connected between said generator and said electro-responsive control means for effecting a current supply thereto that is a measure of the rate of change in the speed of the generator.

3. In a brake equipment for vehicles, the combination with a fluid pressure brake, of means for limiting the deceleration of said vehicles comprising an electro-responsive control means, a direct current generator operated in accordance with the speed of the vehicle, means connected between said generator and said electro-responsive control means for effecting a current supply thereto that is a measure of the rate of change in the speed of the generator, and means for automatically maintaining the polarity of the generator independently of the direction of operation of the vehicle.

4. In a brake equipment for vehicles, the combination with a fluid pressure braking means, of means for limiting the deceleration of said vehicle comprising an electro-responsive control means, a direct current generator operated in accordance with the speed of the vehicle, means connected between said generator and said electro-responsive control means for effecting a current supply thereto that is a measure of the rate of change in the speed of the generator, and means for adjusting the sensitivity of the electro-responsive control means to change the permitted rate of deceleration of the vehicle.

5. In a brake equipment for vehicles, in combination, means for applying a braking force to the vehicle, and means for controlling the braking force applied thereto comprising an electroresponsive control means, a direct current generator driven in accordance with the speed of the vehicle for governing the operation of said electroresponsive control means and arranged to deliver a voltage that is a measure of the speed thereof, means connected between said generator and said electroresponsive control means for effecting a current supply to said electroresponsive control means that is a measure of the direction and rate of speed change of the generator, and means for automatically maintaining the polarity of the generator independently of the direction of operation of the vehicle.

6. In a brake equipment for vehicles, in combination, means for applying a braking force to the vehicle, means for limiting the braking force applied to the vehicle, electroresponsive control means for controlling the operation of said limiting means, a direct current generator driven in accordance with the speed of the vehicle for governing the operation of said electroresponsive control means and arranged to deliver a voltage that is a measure of the speed thereof, means connected between said generator and said electro-responsive control means for effecting a current supply to said electroresponsive control means that is a measure of the direction and rate of speed change of the generator, and means for adjusting the sensitivity of the electroresponsive control means to change the permitted rate of deceleration of the vehicle.

7. In a brake equipment for vehicles, in combination, means for applying a braking force to the vehicle, means for limiting the braking force applied to the vehicle, electroresponsive control means for controlling the operation of said limiting means, a direct current generator driven in accordance with the speed of the vehicle for governing the operation of said electroresponsive control means and arranged to deliver a voltage that is a measure of the speed thereof, and means connected between said generator and said electroresponsive control means for effecting a current supply to said electroresponsive control means that is a measure of the direction and rate of speed change of the generator.

8. In a brake equipment for vehicles, in combination, means for applying a braking force to the vehicle, means for limiting the braking force applied to the vehicle, electroresponsive control means for controlling the operation of said limiting means, a direct current generator driven in accordance with the speed of the vehicle for governing the operation of said electroresponsive means and arranged to deliver a voltage that is a measure of the speed thereof, and a condenser in series circuit relation between said generator and said electroresponsive control means.

9. In a brake equipment for vehicles, in combination, means for applying a braking force to the vehicle, means for limiting the braking force applied to the vehicle, electroresponsive control means for controlling the operation of said limiting means, a direct current generator driven in accordance with the speed of the vehicle for governing the operation of said electroresponsive means and arranged to deliver a voltage that is a measure of the speed thereof, and a transformer having its primary winding connected in circuit with said generator and its secondary winding connected in circuit with the winding of said electroresponsive control means.

10. In a brake equipment for vehicles, in combination, means for applying a braking force to the vehicle, means for limiting the braking force applied to the vehicle, electroresponsive control means for controlling the operation of said limiting means, a generator driven in accordance with the direction and speed of the vehicle, means for controlling the energization of said electroresponsive means from said generator whereby the direction of current flow therebetween is a measure of the direction of speed change of said vehicle and the degree of energization is a measure of the amount of such acceleration or deceleration, and means for maintaining the polarity of the generator in the same direction irrespective of the direction of operation of the vehicle.

11. In a brake equipment for vehicles, in combination, means for applying a braking force to the vehicle, means for limiting the braking force applied to the vehicle, a contact making electrically controlled torque relay having a magnetic circuit comprising a polarized field portion and an armature portion, a winding for energizing said armature portion, a direct current generator driven in accordance with the speed of the vehicle for governing the operation of said electroresponsive means and arranged to deliver a voltage that is a measure of the speed thereof, and a transformer having its primary winding connected in circuit with said generator and its secondary winding in circuit with the armature winding of said electrically controlled torque relay.

12. In a brake equipment for vehicles, in combination, a brake cylinder, means for controlling the rate of deceleration of said vehicle comprising magnet valve devices for controlling the degree of fluid pressure in said brake cylinder, a contact making electrically controlled torque relay for controlling said magnet valve devices and having a magnetic circuit comprising a polarized field portion and an armature portion, a winding for energizing said armature portion, a direct current generator operated in accordance with the speed of the vehicle, means connected between said generator and said electrically controlled relay for effecting a current supply thereto that is a measure of the rate of change in the speed of the generator, and means for adjusting the sensitivity of the relay to change the permitted rate of deceleration of the vehicle.

13. In a brake equipment for vehicles, in combination, a brake cylinder, manually operated means for effecting the supply of fluid under pressure to said brake cylinder, means for controlling the pressure in said brake cylinder comprising magnet valve devices and a contact making electrically controlled torque relay having a magnetic circuit comprising a polarized field portion and an armature portion, a winding for energizing said armature portion, a generator driven in accordance with the direction and speed of the vehicle, means for controlling the energization of the armature winding of said electrically controlled torque relay from said generator whereby the direction of current flow therebetween is a measure of the direction of speed change of said vehicle and the degree of energization is a measure of the amount of such deceleration, and means for maintaining the polarity of the generator in the same direction irrespective of the direction of operation of the vehicle.

14. In a brake equipment for vehicles, in combination, a brake cylinder, manually operable means for effecting the supply of fluid under pressure to said brake cylinder, an application magnet valve device for limiting the supply of fluid under pressure to said brake cylinder, a release magnet valve device for releasing fluid under pressure from said brake cylinder, a contact making electrically controlled torque relay for controlling said magnet valve devices having a magnetic circuit comprising a field portion and an armature portion, a winding for energizing one of said portions, a generator driven in accordance with the direction and speed of the vehicle, means for controlling the energization of said torque relay from said generator whereby the direction of current flow therebetween is a measure of the direction of speed change of the vehicle, and the degree of energization is a measure of the amount of such acceleration or deceleration, contact making means controlled by said relay for controlling the operation of said magnet valve devices when the relay is moved in one direction from a neutral position, and control circuits for controlling the rate of acceleration of the vehicle when the relay is moved in the opposite direction from a neutral position, and means for controlling the flow of energy from said generator to the winding of said relay for actuating it in the one direction or in the other direction in accordance with the acceleration or deceleration of the vehicle.

GEORGE W. BAUGHMAN.